US009671068B2

(12) United States Patent
Zulfiquar

(10) Patent No.: US 9,671,068 B2
(45) Date of Patent: Jun. 6, 2017

(54) PIPELINE LEAKAGE PROTECTION VAULT SYSTEM

(71) Applicant: Mohammed Zulfiquar, Birmingham (GB)

(72) Inventor: Mohammed Zulfiquar, Birmingham (GB)

( * ) Notice: Subject to any disclaimer, the term of this patent is extended or adjusted under 35 U.S.C. 154(b) by 140 days.

(21) Appl. No.: 14/546,328

(22) Filed: Nov. 18, 2014

(65) Prior Publication Data

US 2015/0136234 A1 May 21, 2015

Related U.S. Application Data

(60) Provisional application No. 61/905,393, filed on Nov. 18, 2013.

(51) Int. Cl.
*F16K 23/00* (2006.01)
*F17D 5/02* (2006.01)
*F17D 3/01* (2006.01)

(52) U.S. Cl.
CPC ................ *F17D 5/02* (2013.01); *F17D 3/01* (2013.01); *Y10T 137/0318* (2015.04); *Y10T 137/5762* (2015.04)

(58) Field of Classification Search
CPC ......... Y10T 137/5762; Y10T 137/0452; F16L 2201/30; G01M 3/18; F17D 5/02
USPC ................................. 137/312; 73/49.1, 49.6
See application file for complete search history.

(56) References Cited

U.S. PATENT DOCUMENTS 2,759,175 A * 8/1956 Spalding ............... G01M 3/045 138/104
3,581,703 A * 6/1971 Hosack ..................... F41H 9/06 102/281
3,721,898 A * 3/1973 Dragoumis ........... G01M 3/045 138/104
4,332,170 A * 6/1982 Belval .................. G21C 17/002 340/605
5,484,024 A * 1/1996 Ladd ....................... E21B 33/08 166/369
5,971,011 A * 10/1999 Price ....................... E03B 7/071 137/456
6,386,225 B1 * 5/2002 Holtby ...................... E03B 7/02 137/255
7,705,747 B2 * 4/2010 Twitchell, Jr. ....... G08B 25/009 340/870.01

(Continued)

*Primary Examiner* — Reinaldo Sanchez-Medina

(57) ABSTRACT

A pipeline leakage protection vault system includes a plurality of leakage protection vault modules and a central control unit adapted to be communicably configured to each other. Each module includes a retrofittable configuration adapted to include sub-modules coupled around the pipeline. Each sub-module includes a protective casing, spacer rings and a vault door. The protective casing is adapted to compliment the portion of the pipeline to be fitted to protect the fluid in event of leakage. Further, the spacer rings are adapted to be disposed circumferentially over the protective casing in spaced relationship from each other. The spacer rings includes a plurality of components adapted to monitor parameters associated with the pipeline to generate real time data related to the pipeline. Furthermore, the vault door disposed over the top protective casing and rest over the spacer rings covering the sub-module and withholding the fluid in case of leakage.

15 Claims, 5 Drawing Sheets

(56) References Cited

U.S. PATENT DOCUMENTS

| | | | | |
|---|---|---|---|---|
| 8,342,237 | B1 * | 1/2013 | Brewer | E21B 43/127<br>166/81.1 |
| 8,749,393 | B1 * | 6/2014 | Tollefson | G01M 3/2876<br>137/460 |
| 2002/0179300 | A1 * | 12/2002 | Gay | E21B 33/08<br>166/81.1 |
| 2003/0011363 | A1 * | 1/2003 | Wayman | G01N 27/82<br>324/238 |
| 2006/0137431 | A1 * | 6/2006 | Fernandes | F16L 59/18<br>73/49.1 |
| 2009/0308140 | A1 * | 12/2009 | Haseloh | G01M 3/2815<br>73/40.5 R |
| 2012/0180877 | A1 * | 7/2012 | Pallais | G01M 3/002<br>137/487.5 |
| 2012/0266661 | A1 * | 10/2012 | Fritjofsson | G01M 3/04<br>73/49.1 |
| 2014/0260555 | A1 * | 9/2014 | Howard | G01M 3/022<br>73/49.1 |
| 2014/0266744 | A1 * | 9/2014 | Lyon | G01M 3/165<br>340/605 |

* cited by examiner

PIPELINE LEAKAGE PROTECTION VAULT SYSTEM

CROSS-REFERENCE TO RELATED PATENT APPLICATION

This application is the non-provisional filing of provisional application No. 61/905,393, filed 18 Nov. 2013 and titled Oil Pipeline Protection Vault-Zero Failure (OPPV-ZF).

BACKGROUND

Field of Endeavor

The present disclosure relates to the field of pipeline monitoring and protection, and, more particularly, a pipeline leakage protection vault system.

Brief Description of the Related Art

Pipelines are most significant mode for transporting fluid fuels, such as Oil and Gas; equally significant is its monitoring and protection from various unwanted issues, such as leakage, theft etc. Such unwanted issues directly or indirectly affect the oil and gas communities and environment throughout the world. In Nigeria alone, for instance, oil pipeline theft reduces output by approximately 15% per annum representing a loss of $7 billion plus. Due to the sensitivity of these thefts, the true figure may be even greater than the considerable 16,083 recorded pipeline breaks in the last decade. Similarly, leakage in the pipelines is great threat to environment, which badly affects surrounding and living beings around the leakage area.

Various efforts in past 50 years have been made from time to time to overcome with such unwanted issues on selected region basis across the pipelines path, using methods or tools, such as conducting statistical analysis, or doing airborne reconnaissance, or regular pressure monitoring of the pipelines, Computational Pipeline Monitoring (CPM) software, etc. Further, such methods and tools are limiting in respect of what factor are required to be monitored in which region of the pipeline, for which an exhaustive separate analysis are made on the pipes before its installation. For example, if the pipe in a pipeline is required to be installed in pressure sensitive areas, such as in deep sea or ocean or above the hills, then pipe is required to be tested various pressure tests before installation. After installation, such pipes are installed with such CPM software that are capable of regularly monitoring pressure. In such event, other parameter relating to pipeline in those area may be ignore, which risks the pipeline failure due other factor that may not be assumed or ignored. It means that the presently available pipelines are always lacks integrity in terms of risk due to various unknown factor that may also result to pipeline leakage, failure or theft at any portion of the entire pipeline.

Furthermore, wherever, such method or tools are installed along the pipelines are generally utilized as data collection tools or method which sends all the collected data to a specific data centers for its processing, which increase the load on the data center and delays the information relevant to the pipeline.

In all that regard to above problems very little innovation has taken place in the pipeline integrity, where the entire pipeline is prevented or monitored on the regular basis and that also reduces such delays in generating data and reducing load on the central servers. This is largely due to the fact pipelines were new and risks were determined to be low. In addition, the values of oil or gas were relatively low, at around $10 per barrel, which made pipeline theft virtually non-existent. The world today now has a far different landscape as the price of oil and gas per barrel hovers around $100. Because of the changes, the oil and gas industry is desperate to address the massive financial losses and environmental degradation that are associated with both pipeline theft and leakage. In addition, the pipeline industry is grappling with mounting regulatory pressures.

Even if by all the measures irrespective of complexity of the any such available tools or method may at one time consider to be satisfactory in arranging and sending any relevant information in an event of leakage, it fails to however, stop such leakage instantly. Whatever time that is required to stop the leakage of the fluid results wastage of fluid and pollution to the environment.

Unfortunately the lack of innovation and effective investment in research and development to address these issues has meant the solutions 20 years ago are no different to the ones offered today by servicing companies. Accordingly, there exists a need innovation in relation to the pipeline integrity, where the entire pipeline is prevented or monitored on the regular basis and that also reduces such delays in generating data and reducing load on the central servers; and at the same time may be capable of avoiding such leakage of the fluids to environment.

SUMMARY

The present disclosure describes an integrated pipeline monitoring and protection system in the pipeline utilized for carrying fluids such as oil and gas. This will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a pipeline leakage protection vault system for protection of leakage in a pipeline, which will offer real time monitoring and protection of the entire pipeline regarding leakage, theft or predict even future leakage and enables to take preventive measures to avoid such leakage or theft; and in event of any leakage capable of withholding the fluid (oil) therewithin. Another object of the present disclosure is to provide such module that may installed along the entire pipeline to enable pipeline integrity in terms of protection of the entire pipeline as against the available prior-art technologies which are largely based on the protection or presentation of specific regions of the pipeline. Another object of the present disclosure is to provide such a module that is capable of monitoring, if required, all the relevant parameters of the pipelines in a cost effective manner as against the available prior-art technologies where specific tools or method are incorporated on the pipeline which are only required in that region of the pipeline because of huge costing involved in installing all the tools and method at each locations of the pipelines. Another object of the present disclosure is to provide such module or system that are capable of generating real time data of the pipeline and at the same time reduce the processing load on a central server. Furthermore, one of the most important object of the present disclosure is to preclude oil/gas leakage in any case to avoid pollution and wastage of thereof. Various other objects and features of the present disclosure will be apparent from the following detailed description and claims.

The above noted and other objects, in one aspect, may be achieved by a pipeline leakage protection vault system of the present disclosure. A pipeline leakage protection vault system includes a plurality of leakage protection vault modules and a central control unit adapted to be communicably configured to the plurality of modules. The plurality of leakage protection vault modules adapted to be circumferentially disposed to portions of a pipeline and capable of communicably configured to each other to generate a plurality of real time data relating to the pipeline. Each module includes a retrofittable configuration adapted to include at least two sub-modules coupled to be snugly disposed circumferentially around the portion of the pipeline. Each sub-module includes at least one protective casing, spacer rings and a vault door. The protective casing is adapted to compliment the portion of the pipeline to be fitted thereover to protect the fluid in event of leakage of the pipeline. Further, the spacer rings are adapted to be disposed circumferentially over the protective casing in spaced relationship from each other. The spacer rings includes a plurality of components adapted to monitor a plurality of parameters associated with the pipeline and capable of generating the plurality of real time data related to the pipeline. Furthermore, the vault door disposed over the top protective casing and rest over the spacer rings covering the sub-module. The vault door is capable of withholding the fluid in case of leakage of the pipeline thereby blocking the escaping of the fluid in environment.

The central control unit which is adapted to be communicably configured to the plurality of modules receives such real time data related to the pipeline and generate a plurality of related information of the pipeline. In one further preferred embodiment, at least one GPS (Global Positioning System) sensor/nanosensor are disposed on the spacer ring to coordinated with a GPS satellite to enable the communication between the plurality of modules and the central control unit.

In one embodiment, at least one of the plurality of components disposed on the spacer rings is at least one oil leakage sensor/nanosensor to monitor/sense the parameters related to leakage or security breach in the pipeline and subsequently communicate the real time data of leakage or security breach in the pipeline with the central control unit.

In one embodiment, at least one of the plurality of components disposed on the spacer rings is an alarming cloak jet and sensors/nanosensors arrangement. The arrangement includes sensors/nanosensors and an alarming clock jet. The sensors/nanosensors are arranged across the spacer rings to sense the parameters related to leakage or security breach in the pipeline and generate the real time data of leakage or security breach of the pipeline. Further, the alarming clock jet is disposed on the spacer ring and configured to release dense smoke alarming signal coupled with at least one of high pitch audio alarm and visual lights signal, directly upon being sensed by the sensors/nanosensors or upon the instruction of the central control unit in event of the leakage or security breach of the pipeline based on the real time data of leakage or security breach of the pipeline sent to the central control unit by the sensors/nanosensors.

In one embodiment, at least one of the plurality of components disposed on the spacer rings is at least one temperature sensor/nanosensor to detect the real time data relating to thermal parameters of with the pipelines to communicate to the central control unit.

In one embodiment, at least one of the plurality of components disposed on the spacer rings is at least one visual recording device to record video information of the various parameter related to the pipeline about the leakage or security breach and communicate the real time date of the pipeline to the central control unit.

In one embodiment, the system further includes a shut-down-valve configured in the module to be actuated via at least one of the set of sensors/nanosensors or at least one of the components in event of the leakage of the pipeline.

As mentioned above about the protective casing, in one embodiment, the protective casing may be single layered structure. In another embodiment, the protective casing may be multilayered structure with or without an additional layer that is capable of facilitating the process of parameter collection, processing and sending it to central control unit, along by itself or in-combination with the plurality of components configured on the spacer ring. Such additional layer may be capable of communicating with various modules, various components that are configured on the spacer ring and to the central control system, individually, or in in-combination with the various components that are configured on the spacer ring.

In a most preferred embodiment, the protective casing includes top and bottom protective casings and an addition layer of at least one flexible composite layer which incorporates thereon at least one layer of electronic circuitry and a plurality of nanosensors. The layer of electronic circuitry is embedded on the flexible composite layer, and includes a plurality of microchips embedded on each layer thereof. Further, the nanosensors are also embedded on the flexible composite layer in coupling relationship with the electronic circuitry and microchips. A combinational arrangement of the nanosensor, the electronic circuitry and microchips on the flexible composite layer are capable to monitor and process a plurality of parameters, associated with the pipeline to generate at least one of the plurality of real time data relating to the pipeline, such as pipeline leakage, predict stress, strain, fatigue measurement, corrosion and erosion, future leakage or failure, and detect any attempt to theft or tempering in the pipeline. Further, a dielectric coating layer may be coated over the flexible composite layer to protect the flexible composite layer and the combinational arrangement of the nanosensor, the electronic circuitry and microchips.

The top and bottom protective casings are adapted to encase the flexible composite layer from the top and bottom side of the flexible composite layer. Among these layers of the protective casing, the top layer may further change to suit specific requirements or application, for example, the top casing may be of a single layered structure of multiple layered structures.

Further, in additional embodiment, the central control unit which is adapted to communicably configure with the plurality of modules receives such real time data related to the pipeline and generate a plurality of related information of the pipeline from the combinational arrangement of the nanosensor, the electronic circuitry and microchips, at least one of the nanosensor, where at least one nanosensor is a GPS (Global Positioning System) nanosensor, which with association of the electronic circuitry and the microchips, is adapted to coordinated with the GPS satellite to enable the communication between the plurality of modules and the central control unit, individually or in-combination with the GPS (Global Positioning System) sensor/nanosensor that is disposed on the spacer ring.

Further, in another additional embodiment, there may be at least one failsafe mechanism configured on at least one of the flexible composite layer or the spacer ring. The fail safe mechanism may include a plurality of photonics boxes, which independently or in coordination with the combinational arrangement of the nanosensor, the electronic circuitry and microchips, are actuated via voltage to generate information signals in event of leakage, security breach, breakage and monitor of the pipeline on real time basis.

In one further preferred embodiment, the system may further include a photovoltaic arrangement configured to at least the flexible composite layer or the spacer ring, which in coordination with the combinational arrangement of the nanosensor, the electronic circuitry and microchips to generate required voltage for the operation of the photonics boxes and the flexible composite layer.

In one further preferred embodiment, the system may further include a provision of alarming signal in event of any default. Specifically, in the combinational arrangement of the nanosensor, the electronic circuitry and microchips, at least one microchip may be an alarming microchip with an integrated software, which in combination of the nanosensor and the electronic circuitry is adapted to generate alarming signal, the signal being audio, smoke, visual lights, in event of leakage or security breach of the pipeline.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF THE PRESENT DISCLOSURE

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "top," "bottom," and the like, herein do not denote any order, elevation or importance, but rather are used to distinguish one element from another. Further, the terms "a" and "an" herein do not denote a limitation of quantity, but rather denote the presence of at least one of the referenced item.

Figure 1:
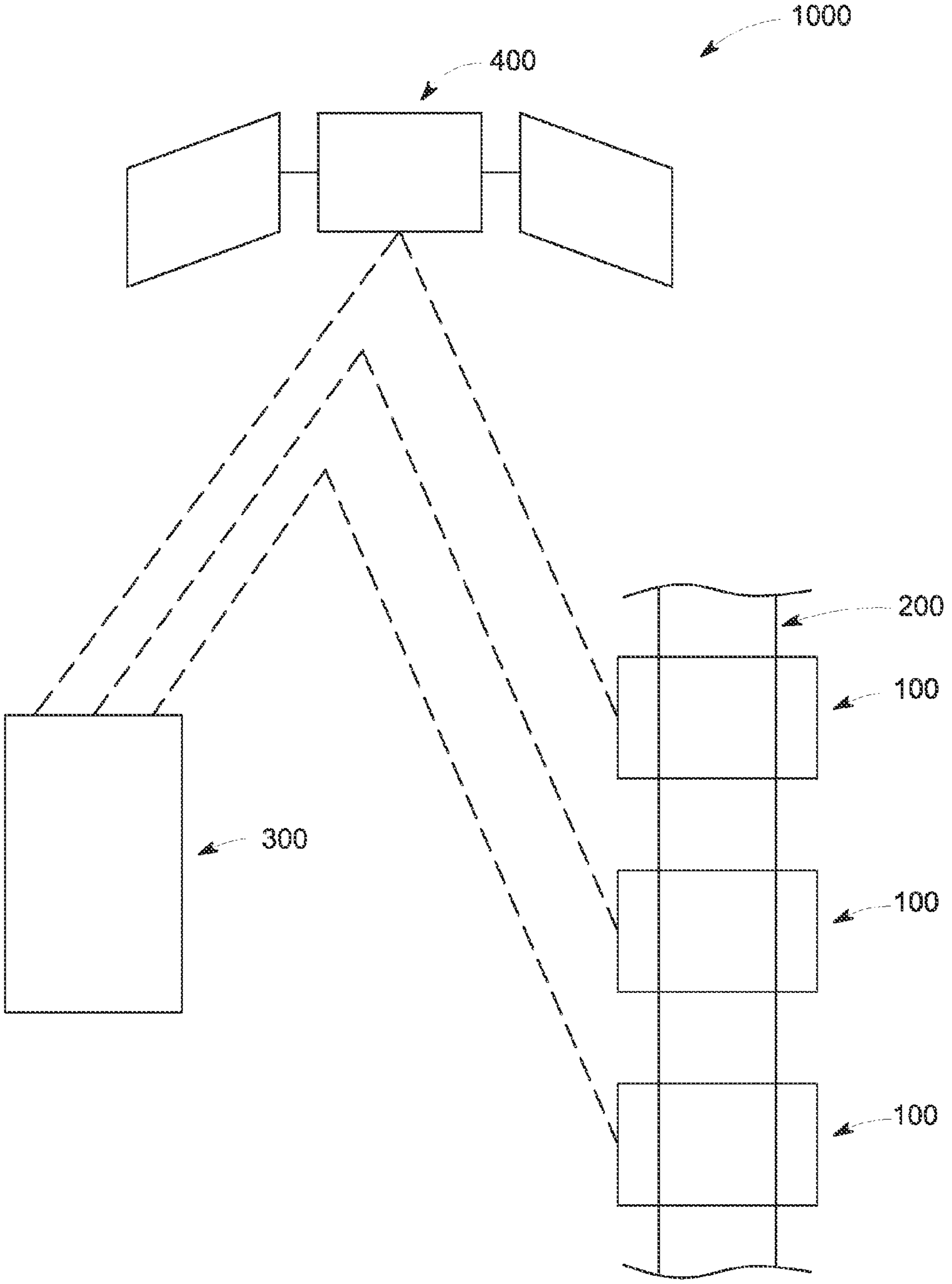
FIG. 1 illustrates block diagram of a pipeline leakage protection vault system, in accordance with an exemplary embodiment of the present disclosure.

Referring now to FIG. 1, an example block diagram of a pipeline leakage protection vault system 1000 (hereinafter referred to as 'system 1000') is illustrated. The system 1000 includes a plurality of leakage protection vault modules 100 (hereinafter referred to as "module(s) 100") disposed at various locations along a pipeline 200, and is capable of communicating with a central control unit 300 (hereinafter referred to as "control unit 300") via a Global Positioning System (GPS) 400. Detailed explanation thereof will be made herein later with reference to FIGS. 2A to 4. As shown in FIG. 1, various modules 200 may be disposed over the pipeline 200. In one embodiment, the modules 100 are adapted to be circumferentially disposed, in spaced or closed relation to each other, to various portions of the pipeline 200 and are capable of communicably configured to each other to generate a plurality of real time data related to the pipeline 200 and communicate it to the control unit 300 via a GPS 400. The real time data related to pipeline may include pipeline leakage data, predict future leakage or failure data, and detect any attempt to theft or tempering related data in the pipeline 200. Further, the control unit 300, which is adapted to communicably configured with the modules 100 receives relevant real time data related to the pipeline and generate a plurality of related information of the pipeline that enables to determine the control authorities any potential leakage, or future leakage that may occur or if there is any attempt of theft or tempering in the pipeline 200, and according enables the concern authorities to act.

Figures 2A, 2B, 2C, 2D:
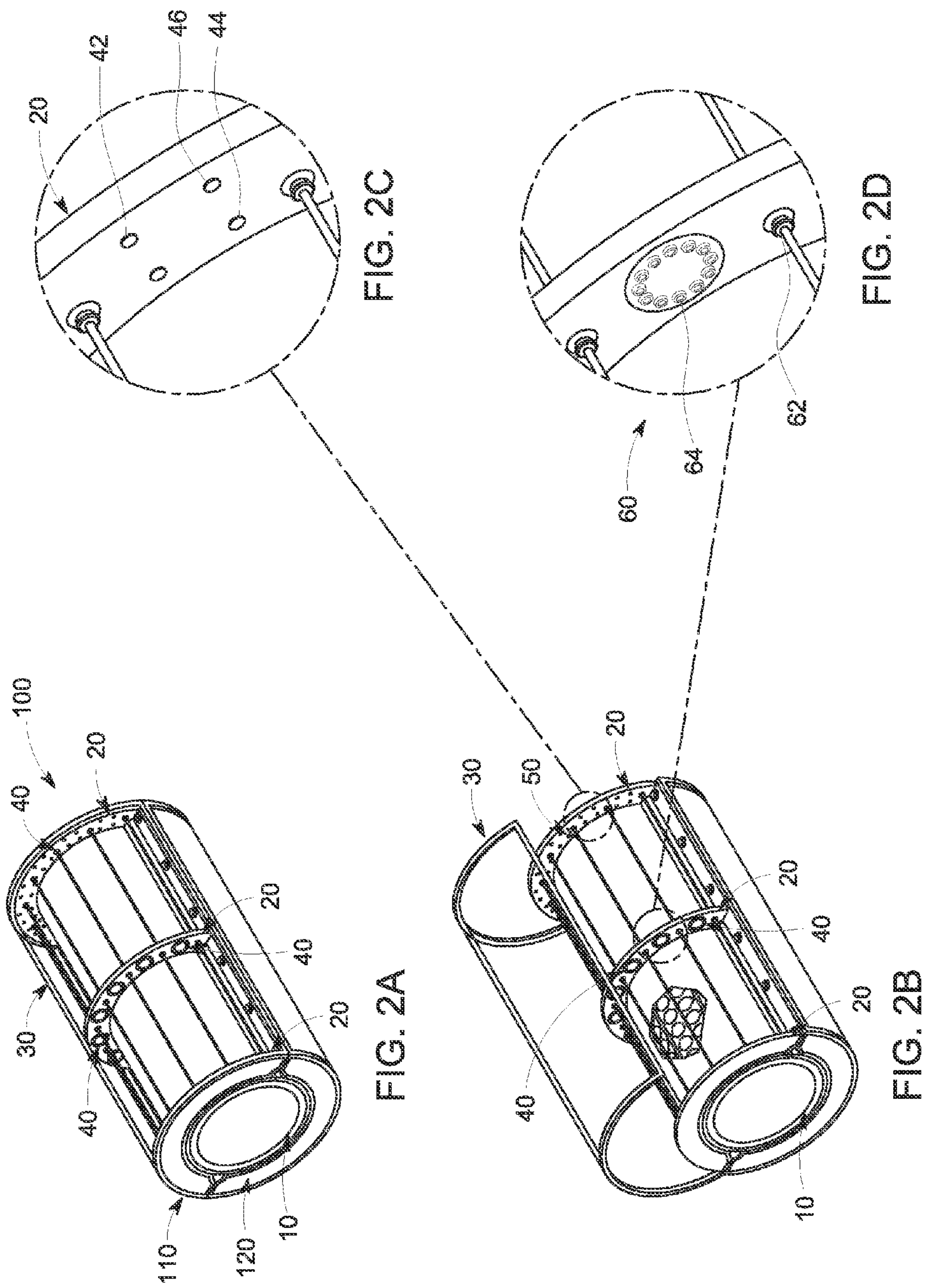
FIGS. 2A to 2D illustrate leakage protection vault that may be configurable on pipelines, in accordance with an exemplary embodiment of the present disclosure.

Referring now to FIGS. 2A to 2D, which illustrate the module 100 that may be configurable on the pipeline 200, in accordance with an exemplary embodiment of the present disclosure. Specifically, FIGS. 2A and 2B illustrate perspective views of the module 100, and FIGS. 2C and 2D enlarged views of various portions of the module 100.

The module 100 includes a retrofittable configuration which is adapted to include at least two sub-modules 110, 120, which can to be coupled to each other to be snugly disposed circumferentially around various portions of the pipeline 200. The sub-modules 110, 120 are coupled to each other via suitable attachments, for example, screws or nut-bolts attachments 112. In another example, the sub-modules 110, 120 may be pivotally coupled to each other via a suitable pivot attachment. For configuring the module 100 on the pipeline 200, the two sub-modules 110, 120 may be uncoupled from each other and subsequently disposed on the portion of the pipeline 200 where it is required to be disposed, and then couple using the suitable attachments. Where the two modules 110, 120 are attached to each other via the pivot attachment, it is required to opened along pivot and secured around the pipeline 200, and subsequently coupled the other side via suitable attachment like nut-bolts or screws.

Each sub-module 110, 120, as shown in FIG. 2B, includes at least one protective casing 10, spacer rings 20 and a vault door 30. The protective casing 10 is adapted to compliment the portion of the pipeline 200 to be fitted thereover to protect the fluid in event of leakage of the pipeline 200. Further, the spacer rings 20 are adapted to be disposed circumferentially over the protective casing 10 in spaced relationship from each other. The spacer rings 20 includes a plurality of components 40 adapted to monitor a plurality of parameters associated with the pipeline 200 and capable of generating the plurality of real time data related to the pipeline 200. Furthermore, the vault door 10 disposed over the protective casing 10 and rest over the spacer rings 20 covering the respective sub-module 110, 120. The vault door 10 is capable of withholding the fluid in case of leakage of the pipeline 200 thereby blocking the escaping of the fluid in environment.

In one embodiment, the vault door 30 is adapted to be communicably configured to one or the plurality of components 40 to receive signals therefrom in event of detection in leakage of the pipeline 200. Upon receiving such signals of leakage in the pipeline 200, the vault door 30 may be actuated to tighten the entire module 100 to withhold the fluid therewithin thereby preventing leakage of the fluid to environment. In simplified the vault module 100 makes the present system 1000 an inbuilt disaster recovery system, which may be capable of withholding the fluid in event of leakage in the pipeline 200 due to external or internal condition or threats thereof.

In one embodiment, the vault module 100 may be automatically activated by the plurality of components 40, when one or combinations of the components 40 senses any leakage across the pipeline 200 and enables the actuation of the vault door 30 to be ready to withhold the leaking oil on the real time basis. In an exemplary embodiment, an automated signal from at least one of the component 40 may be send to the vault door 30, which locks the entire module 100 where the breach has taken place. This ensures the leak is contained within the vault module 100 and all servicing partners are notified immediately with video or audio signal information and an automatically compiled disaster recovery report including functional, operational and financial impact of the breach and sent to the control unit 300.

In one embodiment, the at least one of the plurality of components 40 may be nanosensors along with electronic circuitry and microchips to monitor leakage in the pipeline 200 and send signals to vault door 30 to be actuated to cover the module 100 and withhold the oil therewithin. Such vault module 100, in one further embodiment, may be designed as Mission Critical Applications-Disaster Recovery (MCA-DR) architecture, and may have critical component design of Zero Failure component design which utilizes algorithm framework as of the Tandem Nonstop (Never Fail) computer. In yet another embodiment, the at least one of the plurality of components 40 may be disposed on the spacer rings 20 is at least one oil leakage sensor/nanosensor 42 to monitor/sense the parameters related to leakage or security breach in the pipeline 200 and subsequently communicate the real time data of leakage or security breach in the pipeline 200 with the control unit 300. Such sensor/nanosensor 42 may also monitor leakage in the pipeline 200 and send signals to vault door 30 to be actuated to cover the module 100 and withhold the oil therewithin in addition to communicating with the control unit 300.

The control unit 300 via a GPS sensor/nanosensor 50, which in one embodiment may be disposed are disposed on the spacer ring 20, coordinate with the GPS 400 to enable the communication between the modules 100 and the control unit 300.

In one embodiment, at least one of the plurality of components 40 disposed on the spacer rings 20 may be an alarming cloak jet and sensors/nanosensors arrangement 60. The arrangement 60 includes sensors/nanosensors 62 and an alarming clock jet 64. The sensors/nanosensors 62 are arranged across the spacer rings 20 to sense the parameters related to leakage or security breach in the pipeline 200 and generate the real time data of leakage or security breach thereof. Further, the alarming clock jet 64 is disposed on the spacer ring 20 and configured to release dense smoke alarming signal coupled with at least one of high pitch audio alarm and visual lights signal, directly upon being sensed by the sensors/nanosensors 62 or upon the instruction of the control unit 300 in event of the leakage or security breach of the pipeline 200 based on the real time data of leakage or security breach of the pipeline 200 sent to the control unit 300 by the sensors/nanosensors 62.

In one embodiment, at least one of the plurality of components 40 disposed on the spacer rings 20 is at least one temperature sensor/nanosensor 44 to detect the real time data relating to thermal parameters of with the pipelines 200 to communicate to the control unit 300.

In one embodiment, at least one of the plurality of components 40 disposed on the spacer rings 20 is at least one visual recording device 46 to record video information of the various parameter related to the pipeline 200 about the leakage or security breach and communicate the real time date of the pipeline 200 to the control unit 300.

As mentioned above about the protective casing 10, in one embodiment, the protective casing may be single layered structure. In another embodiment, the protective casing may be multilayered structure with or without an additional layer, such as a flexible composite layer 150 (described below) that is capable of facilitating the process of parameter collection, processing and sending it to control unit 300, along by itself or in-combination with the plurality of components 40, 42, 44, 46, 60 configured on the spacer ring 20. Such additional layer may be capable of communicating with various modules 10, various components 40, 42, 44, 46, 60 that are configured on the spacer ring 20, and to the control system 300, individually, or in in-combination with the various components 40, 42, 44, 46, 60 are configured on the spacer ring 20.

Figure 3B:
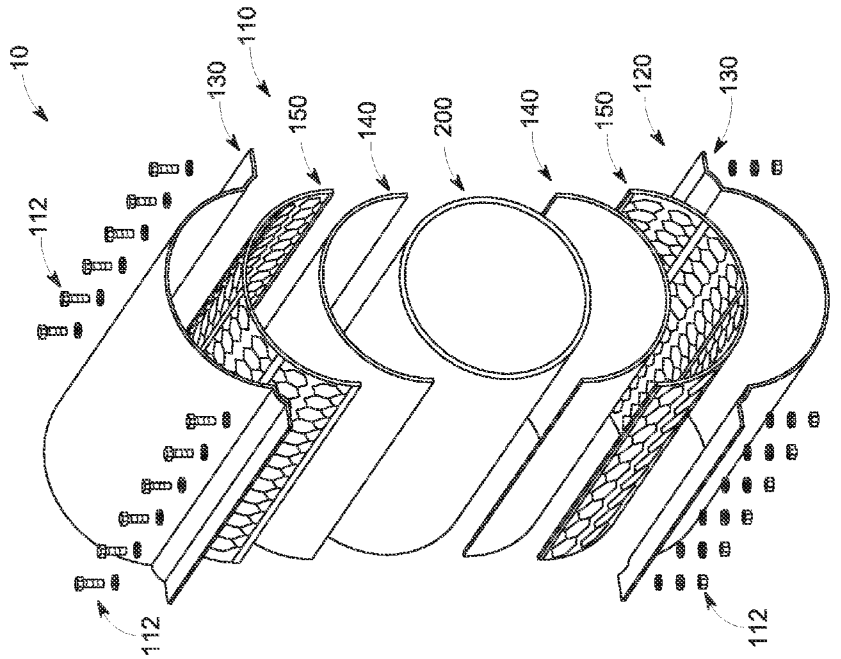
FIGS. 3A and 3B, respectively, illustrate assembled and exploded view of a protective casing in a leakage protection vault, in accordance with an exemplary embodiment of the present disclosure.
Figure 3A:
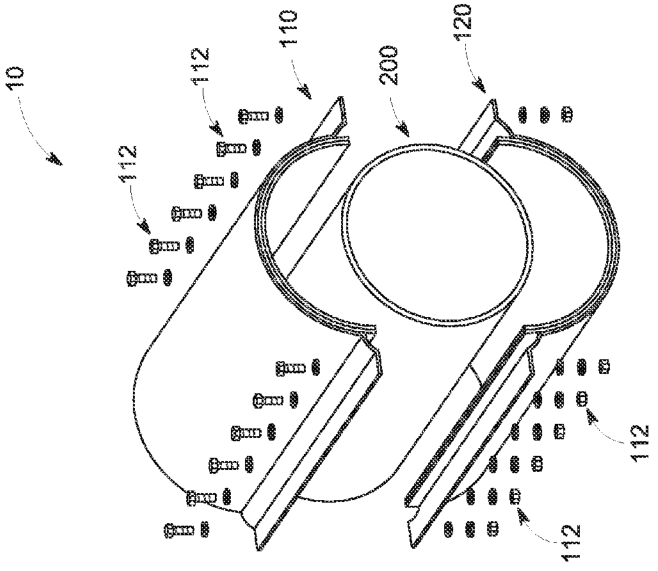

Referring now to FIGS. 3A and 3B to describe the protective covering 10, as per one most preferred embodiment. The protective casing 10 includes top and bottom protective casings 130, 140 and an addition layer of at least one flexible composite layer 150 disposed between the top and bottom protective casings 130, 140 (shown and explained in reference to FIG. 4). Further, each of the sub-module 110, 120 includes at least one layer of electronic circuitry 160 embedded on the flexible composite layer 150. The electronic circuitry 160 comprising a plurality of microchips 162 embedded on each layer of the electronic circuitry 160. Furthermore, a plurality of nanosensors 170 (hereinafter referred to as nanosensors or nanosensor 170 as and when required and shown and explained in reference to FIGS. 3A and 3B) is embedded on the flexible composite layer 150 in coupling relationship with the electronic circuitry 160 and microchips 162. A combinational arrangement of the nanosensor 170, the electronic circuitry 160 and the microchips 162 on the flexible composite layer 150 is capable of monitoring a plurality of parameters associated with the pipeline 200 and generate various real time data, such as mentioned above. Example of the parameter associated with the pipeline 200 may include all the relevant parameters that are capable of determining any leakage, future leakage or any attempt of theft in the pipeline 200, such as, corrosion in the pipeline 200, strain created by internal expending force of fluid in the pipeline 200, condition of peripheral interface of the pipelines 200, changes in temperature, pressure, humidity, shocks, vibrations, and toxic gases along with the position along the pipeline 200, etc.

Alternatively or in another embodiment, arrangement of the nanosensor 170, the electronic circuitry 160 and the microchips 162 on the flexible composite layer 150 is capable of communicably configured with the vault door 30 to send signal to the vault door 30 in event of detection in leakage of the pipeline 200 and actuated thereto to withhold the fluid therewithin, independently or in-combination with the plurality of components 40.

In additional embodiment of the present disclosure, a dielectric layer 152 may be coated over the flexible composite layer 150 to protect the flexible composite layer 150 and the combinational arrangement of the nanosensor 170, the electronic circuitry 160 and microchips 162.

The top and bottom protective casings 130, 140 accommodate the flexible composite layer 150 therewithin in very secure and protective manner from any outside unwanted source, thereby making the module 100 full-proof. In FIGS. 3A and 3B, the arrangement of the sub-modules 110, 120 are illustrated for understanding purpose and may not be considered to be limiting to that specific arrangement, which can vary as per the customers and industry requirement. For example, each of the sub-modules 110, 120 may include more such protective layers to provide additional protection to the modules 100.

Figure 4:
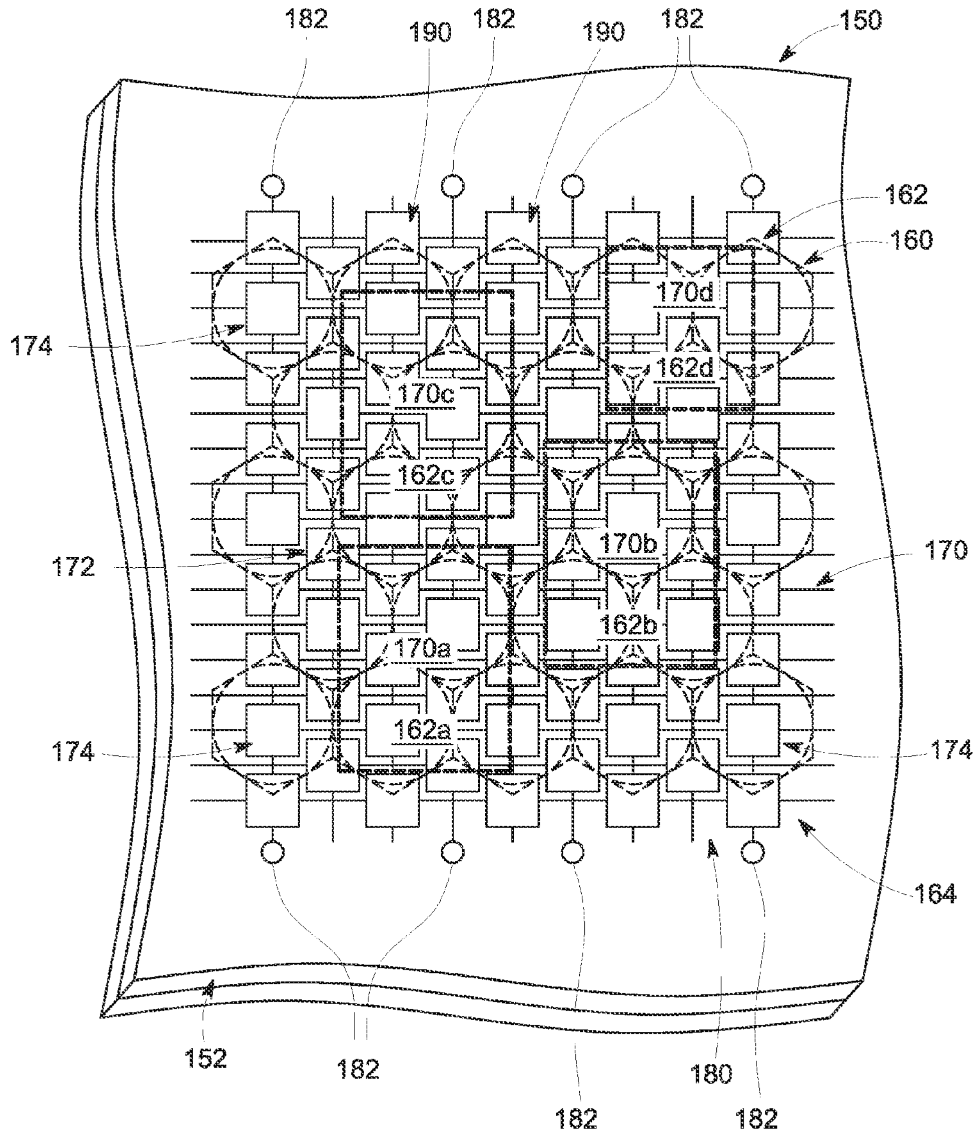
FIG. 4 illustrates an example diagram electronic circuitry and sensor arrangements over the flexible composite layer, in accordance with an exemplary embodiment of the present disclosure.

Referring now to FIG. 4, wherein, an example diagram of the combinational arrangement of the nanosensor 170, the electronic circuitry 160 and the microchips 162 over the flexible composite layer 150 is illustrated.

As shown in FIG. 4, the flexible composite layer 150 has the combinational arrangement of the electronic circuitry 160, the microchips 162 and the sensor/nanosensors arrangements 170 configured thereon. In example embodiment, the combinational arrangement of the electronic circuitry 160, the microchips 162 and the sensor/nanosensors arrangements 170 are printed over the flexible composite layer 150. In such embodiment, the flexible composite layer 150 may be graphene nanosheet made of the intelligent Polyethylene Terephthalate (PET). The flexible composite layer may as per specific demand be produced in a single piece or in various pieces. For example, in one embodiment, the a typical size of one piece of the flexible composite layer may be of size 9 meters with 8 inches diameter, which is a typical size for one piece of a pipe length. Further, the nanosensors 170, for example, may be smart transistor nanosensors. The nanosensors 170, the electronic circuitry 160 and the microchips 162 are printed over the flexible composite layer 150 with closed coordination while maintaining sensors tolerances, escalation mechanisms forming a crystal lattice structure of a matrix 172 of the combinational arrangement of the electronic circuitry 160, the microchips 162 and the sensor/nanosensors arrangements 170 (term sensor/nanosensor may be interchangeable used and intend to have similar meaning) over the flexible composite layer 150, such as shown in FIG. 4.

The matrix 172 may be formed by printing combinational arrangement of the electronic circuitry 160, the microchips 162 and the nanosensors arrangements 170 in rows and columns pattern. The intersection of these rows and columns creates a sensor cell 174 for sensing desired parameters related to the pipeline 200. The spacing between the rows and columns may vary according to sensor/nanosensors 170 and microchip 162 applications based which parameters related to the pipeline 200 required to be sensed and measured. For example, an array of force sensitive cells or pressure sensors along with the respective software coded microchip enables to sense and measure the pressure distribution in the pipeline 200 at the specific location.

In one embodiment, the printing material comprised of a mixture of conductive inks including silver, copper, gold and graphene composite. Further, in one preferred embodiment, the flexible composite layer 150 may also be electrically conductive, to which, when voltage is applied, in association with the matrix 172 obtained by the combinational arrangement of the electronic circuitry 160, the microchips 162 and the sensor/nanosensors arrangements 170, mimic the behavior of the pipeline 200, in event of leakage, theft and regular monitoring of various parameters of the pipeline 200. For example, when voltage is applied, sensor cells 174, which may be octagonal sensor cells 174 slip in and out the crystal lattice structure, which acts as synapse channel between two interfaces of the octagonal sensor cells 174. Due to that, the varying concentration of ions raises or lowers its conductance that transforms into ability to carry information about relevant parameters via the microchips 162 which incorporates respective software. This arrangement of the flexible composite layer 150, the electronic circuitry 160, the microchip 162 and the sensors 170 continuously monitors the changes in the pipeline 200, which provided real time data to the central unit 300.

The matrix 172 obtained by the combinational arrangement of the electronic circuitry 160, the microchips 162 and the sensor arrangements 170 over the flexible composite layer 150 may monitors various parameters related to the pipeline leakage, predict future leakage or failure, and detect any attempt to theft or tempering in the pipeline 200, generating real time data to send it to the control unit 300, which generate various information that help in making prediction of future failure of the pipeline 200 and also information related to present leakage and theft attempt and generate alter to concern authorities. The parameter that may be monitored include, but not limiting to, corrosion in the pipeline 200, strain created by internal expending force of fluid in the pipeline 200, condition of peripheral interface of the pipeline 200, changes in temperature, pressure, humidity, shocks, vibrations, and toxic gases along with the position along the pipeline 200, etc.

In one embodiment, the matrix 172 of the combinational arrangement of the nanosensor 170, the electronic circuitry 160 and microchips 162 may be arranged in a manner where at least one set of nanosensors 170*a* and the microchips 162*a* are configured to measure at least one real time data relating to pipeline leakage along the pipeline 200. The real time data relating to pipeline leakage may include fluid leakage frequency and amount, and fluid leakage position and the like. Similarly, in the combinational arrangement of the nanosensor 170, the electronic circuitry 160 and microchips 162, at least another one set of nanosensors 170*b* and the microchips 162*b* are may be configured to measure at least one real time data relating to pipeline security breach along the pipeline 200. The real time data relating security breach including, but not limited to, tempering, damage or rupture of the pipeline 200 and position thereof.

In both the above scenarios, the system 1000, in such embodiments, may include a shutdown-valve (not shown) coupled to the pipeline 200, which may be actuated via the nanosensors 170*a*, 170*b* and the microchips 162*a*, 162*b* in event of the leakage or tempering, damage or rupture of the pipeline 200.

Similarly to above, the matrix 172 of the combinational arrangement of the nanosensor 170, the electronic circuitry 160 and microchips 162 may be arranged in a manner where at least one another set of nanosensors 170*c* and the microchips 162*c* may be configured to measure at least one real time data to regular monitor general parameters of the pipeline 200 and predict future leakage to enable preventive maintenance of the pipeline 200 at that location. The real time data relating to estimated future leakage and regular monitoring of the pipeline 200 may include, but not limiting to, corrosion in the pipeline, strain created by internal expending force of fluid in the pipeline 200, condition of peripheral interface of the pipeline 200, changes in temperature, pressure, humidity, shocks, vibrations, toxic gases along with the position along the pipeline 200, and the like.

Further, as shown in FIG. 4, and explained in conjunction with FIG. 1, the matrix 172 of the combinational arrangement of the nanosensor 170, the electronic circuitry 160 and microchips 162 may include at least some of the sensors, such as sensors 170*d*, to be position sensors. Such position sensors 170*d* in coordination with the electronic circuitry 160 may be capable of coordinating with all set of sensors 170*a*-170*c* and the microchips 162*a*-162*c* and send relevant data and position along the pipeline 200 to the control unit 300. In one embodiment, such position sensors 170*d* may be GPS (Global Positioning System) which is adapted to coordinate with the GPS satellite 400 to enable the communication between the various modules 100 and the control unit 300.

Figure 5:
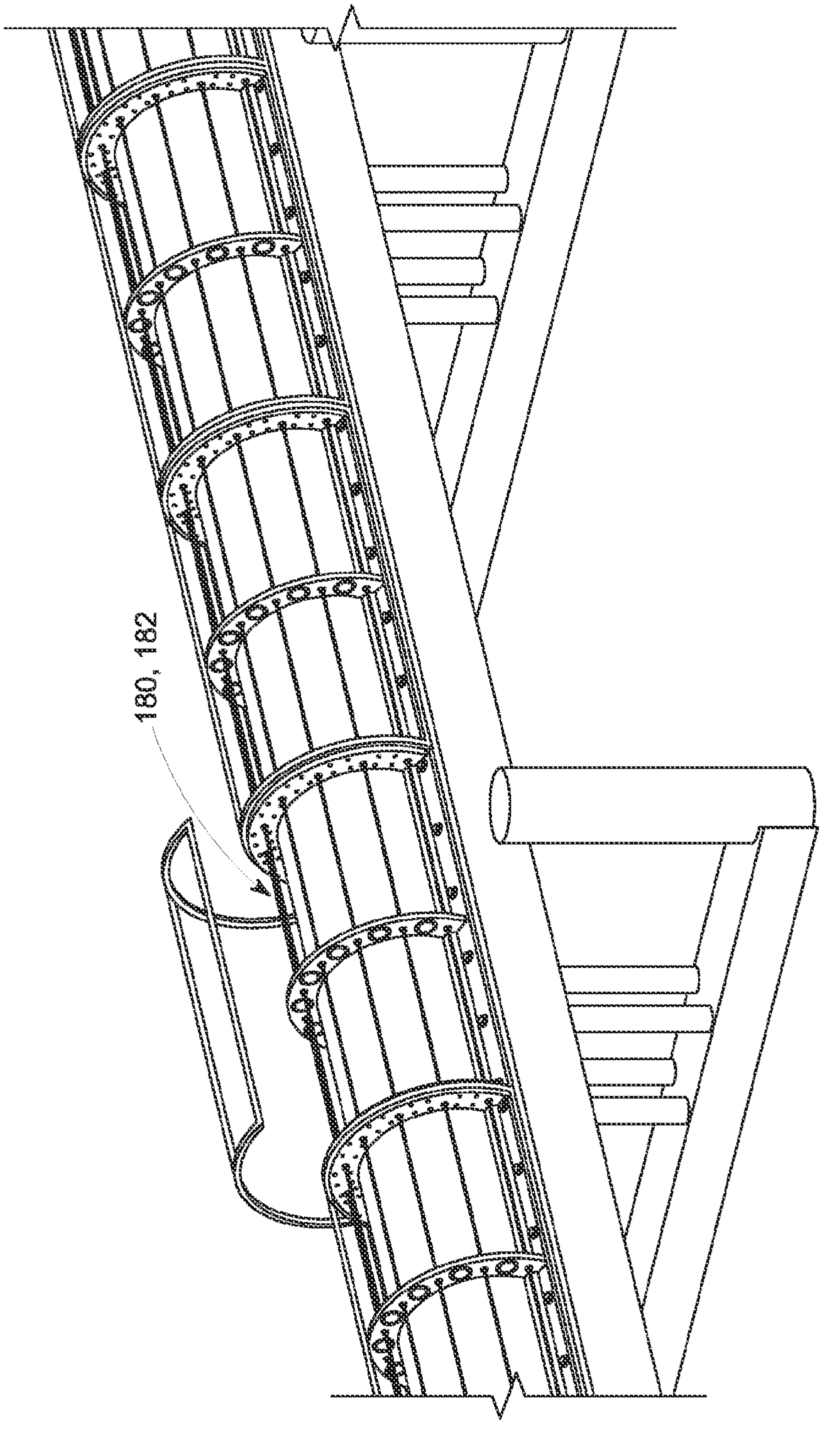
FIG. 5 illustrates perspective view of the various modules configured over the pipeline and applicability of photonics boxes in making the pipeline failsafe and leakage proof, in accordance with an exemplary embodiment of the present disclosure.

Referring now to FIG. 5, in one further preferred embodiment, the system 1000 may include at least one failsafe layer 180 configured on the flexible composite layer 150. The fail safe layer 180 may include a plurality of photonics boxes 182 on the flexible composite layer 150 in coordination with the combinational arrangement of the nanosensors 170, the electronic circuitry 160 and microchips 162. The photonics boxes 180 may be actuated via voltage to generate information signals in event of leakage, security breach, breakage and monitor of the pipeline 200 on real time basis, thereby making failsafe pipeline. The photonics boxes 180 in the fail safe layer 180, includes a transmitting and receiving devices disposed at distal ends of the module 100, which are capable of transmitting and receiving laser lights through a fiber optics cable between the two adjacent modules 100. In the event of any breach in the pipeline 200, the photonics boxes 180 are in coordination with the nanosensors 170, the electronic circuitry 160 and the microchips 162, generates information signals until the primary system is restored. The failsafe layer 180 with the photonic boxes 182 may be capable of generating a single line or several lines with multi layers disposed on the flexible composite layer 150.

Further, in one additional embodiment, there may be at least one failsafe mechanism configured on the spacer ring 20. The fail safe mechanism may include a plurality of photonics boxes, such as boxes 182, which independently or in coordination with the combinational arrangement of the nanosensor 170, the electronic circuitry 160 and the microchips 162, are actuated via voltage to generate information signals in event of leakage, security breach, breakage and monitor of the pipeline 200 on real time basis.

In one further preferred embodiment, the system 1000 may further include a layer of photovoltaic arrangement 190 disposed on the flexible composite layer 150 in coordination with the combinational arrangement of the nanosensor 170, the electronic circuitry 160 and the microchips 162 to generate required voltage for the operation of the photonics boxes 182 and the flexible composite layer 150 as described above.

Further, in one additional embodiment, there may be a photovoltaic arrangement configured on the spacer ring 20, which in coordination with the combinational arrangement of the nanosensor 170, the electronic circuitry 160 and the microchips 162 to generate required voltage for the operation of the photonics boxes 182 and the flexible composite layer 150.

In one further preferred embodiment, the system 1000 may further include a provision of alarming signal in event of any default. Specifically, in the combinational arrangement of the nanosensor 170, the electronic circuitry 160 and microchips 162; at least one microchip 162 may be an alarming microchip 164 with integrated software, which in combination of the nanosensor 170 and the electronic circuitry 160 is adapted to generate alarming signal, in event of leakage or security breach of the pipeline 200. The signal may be audio, smoke or visual lights.

In any event of failure or leakage of the pipeline 200, the system 1000 with the help of modules 100, specifically, the combinational arrangement of the nanosensor 170, the electronic circuitry 160 and microchips 162, is capable of generating real time data at the site of conflicts of the pipeline 200 and sends only relevant data to the control unit 300 via the GPS 400, in turn reducing the processing load on the control unit 300. Alternatively, the modules 100 or specifically, the combinational arrangements of the nanosensor 170, the electronic circuitry 160 and microchips 162 of the modules 100, are capable of generating real time data at the site of conflicts of the pipeline 200 and send all data to the control unit 300 via GPS 400, if required.

All the elements, such as the various sets of sensors 170, 170*a*-170*d* and microchips 162, 162*a*-162*d*, the fail safe layer 180 and the photonic boxes 182, and the photovoltaic arrangement 190 may independently or in coordination with the plurality of components 40, 42, 44, 46, 60 configured on the spacer ring 20 work to generate information signals in event of leakage, security breach, breakage and monitor of the pipeline 200 on real time basis.

The system of the present disclosure is advantageous in various scopes. The system preclude conventional technique of generation limited information related to pipelines and provides integrated pipeline monitoring and protection system, which is capable of offering real time monitoring and protection of the entire pipeline regarding leakage, theft or predict even future leakage and enables to take preventive measures to avoid such leakage. Further, the vault module of the present disclosure may installed along the entire pipeline to enable pipeline integrity in terms of protection of the entire pipeline as against the available prior-art technologies which are largely based on the protection or presentation of specific regions of the pipeline.

Further, until now, as per the known availability of the conventional prior art technologies, the vault module of the present invention may be first of its kind product, which is inbuilt disaster recovery device and provides substantially cent percent protection against leakage of the fluid from the pipeline to fall to the near surrounding or environment. Additionally, apart from having advantage of being inbuilt disaster recovery device, it also includes several additional multilayer protection for complete protection from infrastructure failure especially oil containment when pipes just fail, as described above. In that sense, the module of the present disclosure may is capable of monitoring, if required, all the relevant parameters of the pipelines in a cost effective manner as against the available prior-art technologies where specific tools or method are incorporated on the pipeline which are only required in that region of the pipeline because of huge costing involved in installing all the tools and method at each locations of the pipelines.

Moreover, the module or system of the present disclosure may also be capable of generating real time data of the pipeline and at the same time reduce the processing load on a central control unit. Furthermore, one of the most important advantage of the present disclosure is to preclude oil/gas leakage in any case to avoid pollution and wastage of thereof. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

NUMERAL LIST

1000 Pipeline leakage protection vault system or system
100 Leakage protection vault modules or module
200 Pipeline
300 Central control unit or control unit
400 Global Positioning System (GPS)
110, 120 Sub-modules
112 Attachments
130, 140 Top and bottom protective casings
150 Flexible composite layer
160 Layer of electronic circuitry
162 Plurality of microchips
164 Alarming microchip
170 Plurality of nanosensors
172 Matrix of crystal lattice structure or matrix
174 Sensor cells
**170*a*-170*d*** various set of nanosensors
**162*a*-162*d*** various set of the microchips
180 Failsafe layer
182 Photonics boxes
190 Layer of photovoltaic arrangement
10 Protective casing
20 Spacer rings
30 Vault door
40 Plurality of components
42 Oil leakage sensor/nanosensor
44 Temperature sensor/nanosensor
46 Visual recording device
50 GPS sensor/nanosensor
60 Alarming cloak jet and sensors/nanosensors arrangement
60 Sensors/nanosensors
64 Alarming clock jet

What is claimed is:

1. A pipeline protection vault system for protection of a pipeline in an event of a leakage of fluid flowing in the pipeline or in an event of a security breach along the pipeline, the pipeline protection vault system, comprising: a plurality of protection vault modules adapted to be circumferentially disposed to portions of the pipeline and to communicate to each other to generate a plurality of real time data relating to the pipeline, each of the modules having a retrofittable configuration adapted to include at least two sub-modules coupled to be snugly disposed circumferentially around the portion of the pipeline, wherein each of the sub-modules comprises: at least one protective casing adapted to compliment the portion of the pipeline to be fitted thereover to protect the pipeline in the event of the leakage of the fluid or the security breach of the pipeline, spacer rings disposed circumferentially over the protective casing in spaced relationship from each other, wherein each of the spacer rings comprises a plurality of components adapted to monitor a plurality of parameters associated with the pipeline to generate the plurality of real time data related to the pipeline, and a vault door disposed over the protective casing of at least one of the sub-modules and rest over the spacer rings at a distance from the protective casing to cover the at least one sub-module and defining a space between a top of the protective casing and the vault door itself, wherein the vault door is capable of withholding the fluid in the defined space in the event of leakage of the pipeline, thereby blocking the fluid that would otherwise escape to a surrounding environment; and a central control unit adapted to communicate to the plurality of modules to receive the plurality of real time data based on the plurality of parameters relating to the pipeline to generate a plurality of related information of the pipeline, wherein the plurality of parameters comprise parameters related to the leakage of the pipeline or the security breach in the pipeline.

2. The pipeline protection vault system as claimed in claim 1, wherein the at least one protective casing further comprises, top and bottom protective casings, at least one flexible composite layer disposed between the top and bottom protective casings, at least one layer of electronic circuitry embedded on the flexible composite layer, the electronic circuitry comprising a plurality of microchips embedded on each layer thereof, and a plurality of nanosensors embedded on the flexible composite layer in coupling relationship with the electronic circuitry and microchips, wherein a combinational arrangement of the nanosensor, the electronic circuitry and microchips on the flexible composite layer is adapted to function independently or in combination with the plurality of components of the spacer rings to monitor the plurality of parameters and generate the plurality of real time data related to the pipeline.

3. The pipeline protection vault system as claimed in claim 2, further comprising a dielectric coating layer coated over the flexible composite layer to protect the flexible composite layer and the combinational arrangement of the nanosensor, the electronic circuitry and microchips.

4. The pipeline protection vault system as claimed in claim 2, further comprising at least one failsafe mechanism configured on at least one of the spacer rings or the flexible composite layer, the failsafe mechanism having a plurality of photonics boxes, independently or in coordination with the combinational arrangement of the nanosensor, the electronic circuitry and microchips, are actuated via voltage to generate information signals in event of the leakage of the fluid or the security breach of the pipeline on real time basis.

5. The pipeline protection vault system as claimed in claim 2, further comprising a photovoltaic arrangement configured on at least one of the spacer rings or the flexible composite layer, wherein the photovoltaic arrangement is adapted to generate required voltage for an operation of the photonics boxes and the flexible composite layer.

6. The pipeline protection vault system as claimed in claim 2, wherein in the combinational arrangement of the nanosensor, the electronic circuitry and microchips are configured such that each microchip is adapted to include a software related to specific real time data relating to the pipeline leakage along the pipeline in coordination of the plurality of components disposed on the spacer rings.

7. The pipeline protection vault system as claimed in claim 2, wherein in the combinational arrangement of the nanosensor, the electronic circuitry and microchips, at least one of the nanosensor is a GPS (Global Positioning System) nanosensor, which with association of the electronic circuitry and the microchips, is adapted to coordinate with a GPS satellite to enable the communication between the plurality of modules and the central control unit.

8. The pipeline protection vault system as claimed in claim 1, wherein at least one of the plurality of components disposed on the spacer rings is at least one oil leakage sensor/nanosensor disposed on the spacer rings to monitor/sense the parameters related to the leakage of the fluid or the security breach in the pipeline and subsequently communicate the real time data of the leakage of the fluid or the security breach in the pipeline with the central control unit.

9. The pipeline protection vault system as claimed in claim 1, wherein at least one of the plurality of components disposed on the spacer rings is an alarming clock jet and sensors/nanosensors arrangement, the alarming clock jet and sensors/nanosensors arrangement comprising:

sensors/nanosensors arranged across the spacer rings to sense the parameters related to the leakage of the fluid or the security breach in the pipeline and generate the real time data of the leakage of the fluid or the security breach of the pipeline; and an alarming clock jet adapted to be disposed on the spacer ring and configured to release dense smoke alarming signal coupled with at least one of high pitch audio alarm and visual lights signal, upon sensed by the sensors/nanosensors or upon the instruction of the central control unit in the event of the leakage of the fluid or the security breach of the pipeline based on the real time data of the leakage of the fluid or the security breach of the pipeline sent to the central control unit by the sensors/nanosensors.

10. The pipeline protection vault system as claimed in claim 1, wherein at least one of the plurality of components disposed on the spacer rings is at least one temperature sensor/nanosensor to detect the real time data relating to thermal parameters of the pipelines to communicate to the central control unit.

11. The pipeline protection vault system as claimed in claim 1, wherein at least one of the plurality of components disposed on the spacer rings is at least one visual recording device to record video information of the plurality of parameters related to the pipeline about the leakage of the fluid or the security breach and communicate the real time date of the pipeline to the central control unit.

12. The pipeline protection vault system as claimed in claim 1, further comprising a shutdown-valve coupled to the pipeline which may be actuated via at least one of the plurality of components disposed on the spacer rings in event of the leakage of the pipeline.

13. The pipeline protection vault system as claimed in claim 1, further comprising at least one GPS (Global Positioning System) sensor/nanosensor arrangement to coordinate with a GPS satellite to enable the communication between the plurality of modules and the central control unit.

14. A protection vault for protection of a pipeline in an event of a leakage of fluid flowing in the pipeline or in an event of a security breach along the pipeline, the protection vault comprising: a protection vault module adapted to be circumferentially disposed to portions of the pipeline and to generate a plurality of real time data relating to the pipeline, the module having a retrofittable configuration adapted to include at least two sub-modules coupled to snugly be disposed circumferentially around the portion of the pipeline, wherein each of the sub-module comprises: at least one protective casing adapted to compliment the portion of the pipeline to be fitted thereover to protect the pipeline in the event of the leakage of the fluid or the security breach; spacer rings disposed circumferentially over the protective casing in spaced relationship from each other, wherein each of the spacer rings comprises a plurality of components adapted to monitor a plurality of parameters associated with the pipeline and to generate the plurality of real time data related to the pipeline; and a vault door pivotally disposed over the protective casing of at least one of the sub-modules and rest over the spacer rings at a distance from the protective casing to cover the at least one sub-module and defining a space between a top of the protective casing and the vault door itself, wherein the vault door is capable of withholding the fluid in the defined space in the event of leakage of the pipeline, thereby blocking the fluid that would otherwise escape to a surrounding environment.

15. A method for ensuring protection in a pipeline in an event of leakage of fluid flowing in the pipeline or in an event of a security breach along the pipeline, the method comprising: disposing a plurality of leakage protection vaults at least along various portions of the pipeline, the plurality of leakage protection vaults having at least two sub-modules, wherein each of the sub-modules comprises: at least one protective casing adapted to compliment the portion of the pipeline to be fitted thereover, spacer rings disposed circumferentially over the protective casing in spaced relationship from each other, wherein each of the spacer rings comprises a plurality of components adapted to monitor a plurality of parameters associated with the pipeline, and a vault door disposed over the protective casing of at least one of the sub-modules and rest over the spacer rings at a distance from the protective casing to cover the at least one sub-module and defining a space between a top of the protective casing and the vault door itself, wherein the vault door communicates to the plurality of components; actuating the vault door to cover the vault in the event of leakage in the pipeline to withhold a fluid in the defined space therewithin, thereby blocking the fluid that would otherwise escape to a surrounding environment; and communicating with a central control unit via the plurality of leakage protection vaults to receive the plurality of real time data based on the plurality of parameters relating to the pipeline to generate a plurality of related information of the pipeline, wherein the plurality of parameters includes parameters related to the leakage of the pipeline or the security breach in the pipeline.

* * * * *